(12) United States Patent
Ruffin et al.

(10) Patent No.: US 6,482,762 B1
(45) Date of Patent: Nov. 19, 2002

(54) $NO_x$ CONVERSION CATALYST REJUVENATION PROCESS

(75) Inventors: David E. Ruffin, Moreno Valley, CA (US); Ryan M. Bonderson, Cypress, CA (US); Andrew P. Voss, Cerritos, CA (US)

(73) Assignee: Atlantic Richfield Company, Chicago, IL (US)

( * ) Notice: Subject to any disclaimer, the term of this patent is extended or adjusted under 35 U.S.C. 154(b) by 95 days.

(21) Appl. No.: 09/638,272

(22) Filed: Aug. 14, 2000

(51) Int. Cl.[7] .................... B01J 38/52; B01J 23/16; B01J 23/18
(52) U.S. Cl. .................... 502/33; 502/353
(58) Field of Search .................... 423/235, 239.1; 502/20, 22, 28, 300, 353, 33

(56) References Cited

U.S. PATENT DOCUMENTS

| | | | | |
|---|---|---|---|---|
| 4,131,643 A | * | 12/1978 | Utsunomiya et al. | 423/239 |
| 4,206,081 A | * | 6/1980 | Inaba et al. | 252/440 |
| 4,615,991 A | * | 10/1986 | Obayashi et al. | 502/28 |
| 4,859,439 A | * | 8/1989 | Rikimaru et al. | 423/239 |
| 5,164,351 A | * | 11/1992 | Steinbach et al. | 502/74 |
| 6,025,292 A | * | 2/2000 | Obayashi et al. | 502/27 |
| 2001/0012817 A1 | * | 8/2001 | Nojima et al. | 502/26 |

FOREIGN PATENT DOCUMENTS

| | | | | |
|---|---|---|---|---|
| JP | 54010294 A | * | 1/1979 | B01J/23/92 |
| JP | 57180433 A | * | 11/1982 | B01D/53/36 |
| JP | 62298452 A | * | 12/1987 | B01D/53/36 |
| JP | 10337483 A | * | 12/1998 | B01J/38/60 |

* cited by examiner

*Primary Examiner*—Stanley S. Silverman
*Assistant Examiner*—Jonas N. Strickland
(74) *Attorney, Agent, or Firm*—F. Lindsey Scott; Ekkehard Schoettle

(57) ABSTRACT

A method for cleaning and rejuvenating an at least partially spent de-$NO_x$ catalyst comprising a porous ceramic metal oxide material containing a vanadium oxide and coated on a metal support by cleaning the catalyst with an oxalic acid solution and by contacting the catalyst with a vanadium compound solution.

17 Claims, 2 Drawing Sheets

$NO_x$ CONVERSION CATALYST REJUVENATION PROCESS

FIELD OF THE INVENTION

This invention relates to a method for converting $NO_x$ in various industrial gaseous streams resulting from combustion processes into nitrogen for discharge to the atmosphere.

BACKGROUND OF THE INVENTION

In many industrial applications such as plants for the production of electricity and the like, combustion gas streams are produced which contain nitrogen oxides ($NO_x$) in quantities greater than are permissibly discharged to the atmosphere. In such processes the gaseous stream discharged may be treated for the removal of sulfur oxides, the oxidation of carbon monoxide to carbon dioxide, and the removal of nitrogen oxides. Such processes are well known to those skilled in the art and commercial catalysts are available for use for such purposes. Relatively well-defined standards exist for the amounts of these materials which can be discharged to the atmosphere. In one such process, the gaseous stream is contacted with a selective catalyst for the reduction of $NO_x$ in the presence of ammonia to produce nitrogen and water. Desirably the gas is contacted with the selective de-$NO_x$ catalyst at temperatures from about 575 to about 800° F., and preferably at temperatures from about 700 to about 800° F. Typically the gases are produced in combustion processes which may be direct fired processes where steam is produced in boiler tubes for use to drive turbines and the like or in processes where air is compressed and combusted with fuels such as natural gas to produce a hot gaseous stream which is used to drive turbines. A wide variety of other industrial processes can also produce such gases. In many instances, heat is recovered from the discharged stream, which may be at a temperature as high as 1400° F. or higher. As the gaseous stream passes through various heat exchange zones such as heat recovery banks of tubes, the temperature is dropped progressively. The catalyst is generally positioned in a zone where the temperature will be between about 575 to about 800° F. Such techniques are well known to those skilled in the art.

In one instance, the catalyst is supplied as cubes which may be in the neighborhood of 15 inches by 15 inches by 15 inches. The cubes are wrapped in sheet metal, which is typically stainless steel and include a plurality of stainless steel screens. A suitable porous ceramic metal oxide such as titanium dioxide is used to coat the stainless steel screens. The ceramic metal oxide includes a quantity of vanadium as vanadium oxide $V_2O_5$). The vanadium is typically present as vanadium oxide and is frequently reported as $V_2O_5$. While the quantities of vanadium oxide on the catalyst can vary widely, the criteria of primary interest with respect to the catalyst is its activity with respect to the conversion of $NO_x$. One such catalyst is Hitachi SCR Catalyst (MSDS PS5953).

When the catalyst is spent as indicated by activity tests typically provided by the vendor of the catalyst, the catalyst must be replaced. As noted previously, the catalyst may be supplied as cubes, which are simply stacked in the flow path of the gases to provide a catalytic zone through which the gases pass. A plurality of such zones may be used by using multiple stacks of the catalyst cubes. The catalyst could also be supported in other ways if desired.

Since replacement of the catalyst is relatively expensive, attempts have been made to develop a method for regenerating the de-$NO_x$ catalyst.

SUMMARY OF THE INVENTION

According to the present invention, such catalysts may be regenerated and cleaned by a method comprising contacting the catalyst with an aqueous oxalic acid solution containing from about 1 to about 4 weight percent oxalic acid to produce a cleaned catalyst; drying the cleaned catalyst to produce a dried, cleaned catalyst; contacting the dried, cleaned catalyst with an aqueous vanadium compound solution containing from about 10 to about 100 g/L as $V_2O_5$ of at least one water soluble vanadium salt to produce a rejuvenated catalyst; and, drying the rejuvenated catalyst.

In many instances it may be desirable to test the catalyst for activity prior to cleaning and rejuvenating the catalyst.

DESCRIPTION OF PREFERRED EMBODIMENTS

Figure 1:
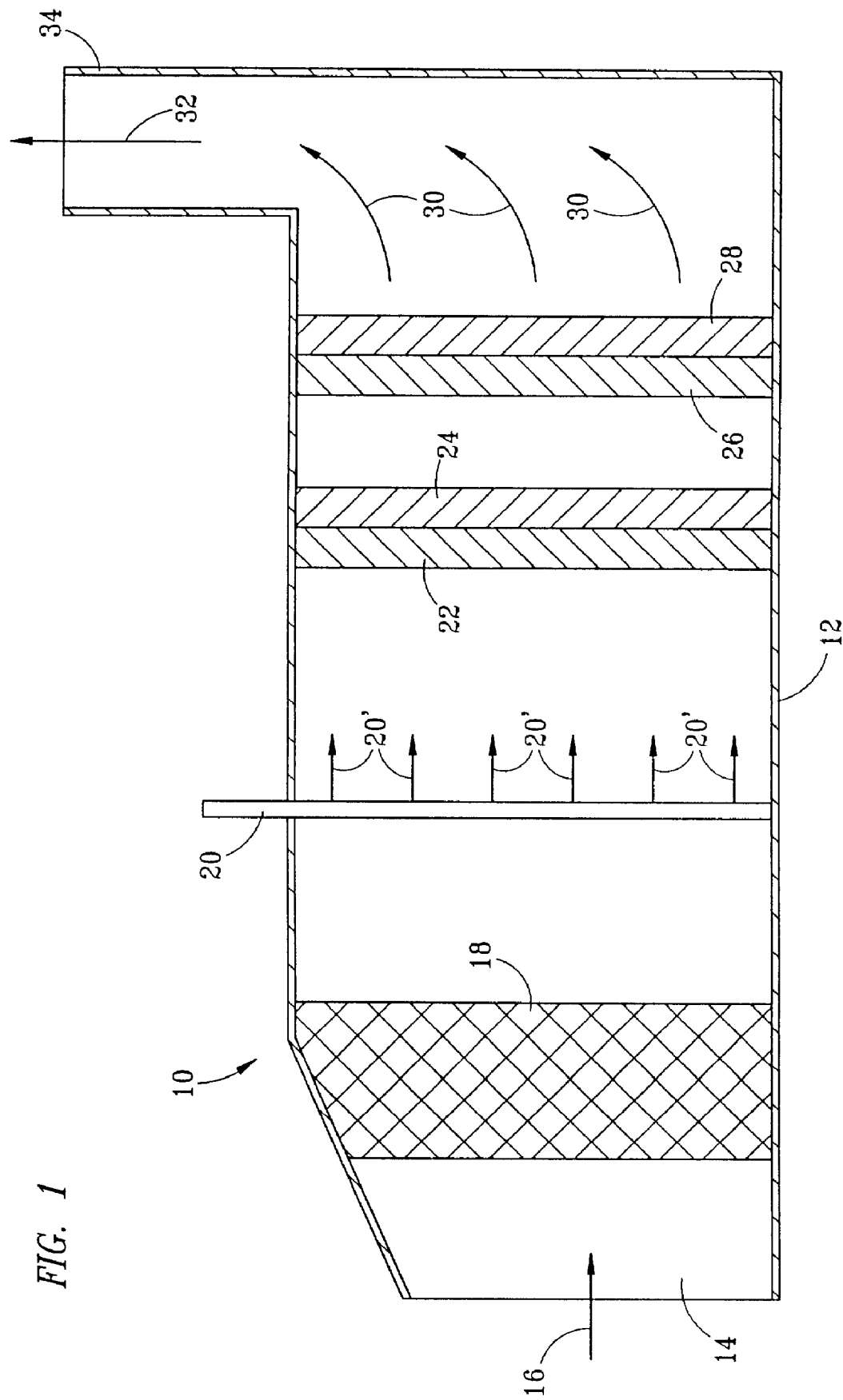
FIG. 1 shows a schematic diagram of a process wherein combustion gases are treated using a catalyst which is effectively generated by the process of the present invention.

FIG. 1 schematically shows a combustion gas treatment facility. The facility 10 comprises a duct 12 through which the combustion gases are passed. The combustion gases are charged to facility 10 via an inlet 14 as shown by an arrow 16. The gases pass through a carbon monoxide oxidation section 18 which does not constitute a part of the present invention.

Ammonia is injected into the flowing gas stream via a line 20 which includes a plurality of nozzles 20'. The gaseous stream containing the injected ammonia is passed into contact with a vanadium oxide-containing catalyst layer 22 which, as discussed above, may comprise a plurality of stacked cubes of catalyst positioned for intimate contact of the gases with the stainless steel sheets coated with the ceramic oxide and vanadium oxide. Zone 22 is shown as filling the entire cross section of duct 12. A second catalyst zone 24, a third catalyst zone 26 and a fourth catalyst zone 28 are shown. No attempt has been made in this drawing to show the various heat recovery systems which may be present in such a duct, but the catalyst zones are considered to be at a zone at which the gas is at a proper temperature for reaction over the catalyst to convert $NO_x$ in the presence of ammonia into nitrogen and water. The reacted gas stream is recovered as shown by arrows 30 and passed via arrow 32 to discharge to a stack 34. A wide variety of industrial processes produce combustion gases which may be treated in a similar fashion, as well known to those skilled in the art. The present invention is not directed to the specific systems used to treat the combustion gases, but rather to the regeneration of the de-$NO_x$ catalyst used for such regeneration.

According to the present invention, a method is provided for cleaning and rejuvenating an at least partially spent de-$NO_x$ catalyst which comprises a porous ceramic metal oxide material containing vanadium oxide coated on a metal support, the method comprising contacting the catalyst with an aqueous oxalic acid solution containing from about 1 to about 4 weight percent oxalic acid to produce a cleaned catalyst; drying the cleaned catalyst to produce a dried, cleaned catalyst; contacting the dried, cleaned catalyst with an aqueous vanadium compound solution containing from about 10 to about 100 g/L as $V_2O_5$ of at least one water soluble vanadium salt to produce a rejuvenated catalyst; and, drying the rejuvenated catalyst.

This method is most effectively used by testing the catalyst for its effectiveness in converting nitrous oxide (NO) prior to treatment of the catalyst for cleaning and rejuvenation. If the activity of the catalyst is above 50 percent, then it will generally not be necessary to rejuvenate the catalyst, and the catalyst may simply be cleaned and returned to service. It has been found that when excessive amounts of vanadium oxide are deposited on the catalyst, the activity of the catalyst may actually be reduced. Accordingly it is undesirable to treat catalyst which is sufficiently active as received.

The tests for catalyst activity are typically provided by the supplier of the catalyst. A representative generalized test procedure supplied by a vendor for a de-$NO_x$ catalyst of this type is as follows:

PROCEDURES FOR DE-$NO_x$ CATALYST ACTIVITY TEST

1. Insert a catalyst test piece (20×100 mm; 6.200 sq. inches total area, both sides) into a quartz catalyst sample holder inside a quartz reactor. Straighten the catalyst test piece first if it has curvature. Center the catalyst test piece at an equal distance from the two parallel sides of a reaction zone in the sample holder and push it all the way down into the sample holder.

The catalyst holder is designed such that all of the gas flow is forced into the rectangular space in which the catalyst is contained and such that no gas bypasses this space (6mm×21.5 mm to about 120 mm long).

Apply a thin coating of vacuum grease to the ground glass joints and close up the reactor putting metal springs in place to hold inlet and outlet sections to the reactor body.

Clamp the reactor in the furnace using enough high temperature wrapping tape inside the clamp to prevent the reactor from being crushed. Tighten down with a wing nut until finger tight. Do not tighten the top clamp as much as the bottom clamp in order to allow for thermal expansion. Make sure the refractory rings (to prevent chimney effect) are installed and all openings at the top and bottom of the furnace are sealed off with quartz wool. Close and lock the furnace door before attaching the tubing connections to the top and bottom of the reactor. These quartz connections can easily break when the door is opened or shut.

Apply vacuum grease to the ball and joint fittings at the top and bottom of the reactor and attach these connections with clamps.

2. Make sure 0.5 SCFH (Standard Cubic Feet per Hour) flow meters are installed for air, nitrogen, ammonia/nitrogen and NO/nitrogen gas feed lines. The range of the carbon dioxide flow meter is 0–10 SCFH. Check to make sure that all flow meters are properly zeroed and spanned. Once zeroed and spanned, the flow meters will usually maintain proper calibration for long periods of time. Recommended procedure is to recalibrate every six months. Rough checks with a Dry Test Meter every two weeks is suggested.

3. Pressure test with 2 psig (pounds per square inch gauge) $N_2$ or air and eliminate any leaks. Install the top and bottom thermocouples.

4. Calibrate NO, $NO_x$ analyzer using certified 200 vppm NO in $N_2$.

Attach a calibrated bottle to first and second inlet positions with a tee, using flexible TFE (tetrafluoroethylene) or nylon tubing. Set bottle outlet pressure at 10 psig. Check to make sure that the pressure of inlet $N_2$ diluent gas to the Gas Divider is also set at 10 psig. The first inlet gas goes to the Divider, while the second gas inlet goes directly to the analyzer without the option of adding diluent.

Calibrate the 0–250 vppm range. For example, use 25, 50, and 75 percent dilution. Then recheck the zero.

5. Turn on the portable $NO_2$ alarm.

6. Power up the heating tracing on the combined air, nitrogen, and water feed line to keep water in the vapor phase after the preheat furnace. Failure to keep the temperature high enough can result in condensation and moisture ahead of the main reactor which may cause reactor damage due to rapid evaporation. Heat trace this line all the way to the quartz reactor inlet so no section is heated to less than 220° F. Turn on auxiliary heat lamps at the top and bottom of the reactor to prevent water from condensing. Power up the effluent line heat tracing.

7. Fire up a Preheat Furnace to about 400° F.

8. Power up the Main Reactor furnace and bring the heat up to about 572° F. at a maximum rate of about 20° F./Min.

9. Establish the following gas flow rates while bypassing the reactor.

| | |
|---|---|
| Air | 0.984 SCFH Nominal Rate |
| Nitrogen $NH_3$ | 1.22 SCFH Nominal Rate |
| 0.1% $N_2$ | 1.65 SCFH Nominal Rate |
| Carbon Dioxide | 0.824 SCFH Nominal Rate |
| 0.1% NO, $N_2$ | 1.37 SCFH Nominal Rate |

Actual desired rates may differ slightly from the nominal rates. Exact correct rates will be supplied from a spreadsheet program that adjusts rates to account for actual gas blend concentrations in order to achieve the following conditions.

| | |
|---|---|
| Total Gas Flow Rate (incl. water): | 6.87 SCFH (60° F. Base) |
| Total Gas Flow Rate (water-free): | 6.05 SCFH (60° F. Base) |

The total gas flow rate of 6.87 SCFH (60° F. Base, including water, is equivalent to a condition of 184 std. liters/hr. 184 liters/hr is in turn equivalent to an area velocity of 51 cu Nm/hr/sq m (cubic normal meters per hours per square meter) of catalyst area.

The catalyst supplier test as used by Applicants has been modified by eliminating $SO_2$ from the gas feed mix. Gas compositions are as follows:

| | Wet Basis | | Dry Basis |
|---|---|---|---|
| | Supplier | Applicants | AET |
| NO vppm | 200 | 200 | 227 |
| $O_2$ % vol | 3 | 3 | 3.41 |
| $CO_2$ % vol | 12 | 12 | 13.64 |
| $SO_2$ vppm | 500 | 0 | 0 |
| $H_2O$ % vol | 12 | 12 | 0 |
| $NH_3$ vppm | 240 | 240 | 273 |
| $N_2$ % vol | 72.9 | 72.96 | 82.90 |
| $NH_3$/NO mol ratio | 1.2 | 1.2 | 1.2 |

10. Turn on the Product Refrigeration System and product sample pump if not already in operation. Admit an effluent slipstream into the analyzer Section. Adjust NO, $NO_x$ flow rate to recommended settings and keep analyzer by-pass to a minimum since the effluent flow rate is quite low and there is not much gas to spare. The on-line CO and hydrocarbon analyzers are not normally needed and hence no flow to these analyzers is needed. Make sure the Analyzer By-pass Flow meter is not set so high that the pump is sucking gas back from the vent line. This can be checked by observing the direction that the Dry Test Meter is turning. For proper operation, the Dry Test Meter must be revolving clockwise. Counter-clockwise rotation indicates that vent gas is being sucked back.

11. Check the NO concentration of the product while bypassing the reactor. Record this number. It should be close to 227 vppm ($H_2O$-free).

12. Turn on the water pump and adjust to the correct rate using the calibration chart. Verify correct rate while feeding from the small burette then switch over to the large burette.

13. Continue to monitor NO. Concentration of NO should not change at this point since the added water is removed by refrigeration before the effluent gases are analyzed.

14. If the NO concentration checks out, then route flow through the main reactor.

15. Before proceeding, make sure all computer inputs are correct, and then execute "RUN." Name the log files according to a Run Number. A formatted disk should be in Drive A to log data. The software may be programmed to log five-minute averages of all tags.

16. Collect data at the following lined-out temperatures at the bottom of the reactor for about 20–30 minutes each.

| | |
|---|---|
| 572° F. | (300° C.) |
| 662° F. | (350° C.) |
| 752° F. | (400° C.) |
| 842° F. | (450° C.) |

Raise temperature about 20° F./min between test conditions.

Document any unusual occurrences or comments. Consult the unit engineer if any problems occur.

17. After the final condition (842° F.), cut out the $NO/N_2$ blend and at the same time increase $N_2$ flow by an identical amount. That is, keep the same total 25 flow rate while eliminating any NO in the feed gas. Keep the temperature at the bottom of the reactor at 842° F. while continuing to record data. Any NO in the product is caused by ammonia ($NH_3$) reacting with air.

18. Decrease the temperature at the bottom of the reactor in the following sequence in order to test $NH_3$ oxidation for 20 minutes at each condition.

| | |
|---|---|
| 842° F. | (450° C.) |
| 752° F. | (400° C.) |
| 662° F. | (350° C.) |
| 572° F. | (300° C.) |

If product $NO_x$ at any temperature is less than 0.75 ppm, it is not necessary to extend the test to lower temperatures.

19. After the final conditions are reached, the test is complete.

20. Remove reactor from the furnace only after it has cooled to less than 110° F. Remove thermocouples from the thermowells, unclamp the reactor and carefully remove the catalyst. Store the catalyst in a labeled, clean dry container.

By the use of this or similar procedures, which are typically supplied by the catalyst vendors to permit catalyst users to evaluate the activity of their catalysts, the activity of the catalyst can readily be determined. If the catalyst activity is greater than 50 percent as measured by a test procedure for determining the conversion of nitrous oxide (NO), then it is unnecessary to rejuvenate the catalyst and it may be simply cleaned and returned to service or returned to service without cleaning if desired. If the activity is less than about 50 percent, the catalyst can be treated by the method described above.

Desirably, the porous ceramic material used in the catalyst is titanium dioxide ($TiO_2$) and desirably the porous ceramic metal oxide is supported on a stainless steel screen. In the embodiment described wherein cubes of catalyst are used containing sheets of stainless steel screen coated with the catalytic materials, the catalyst is generally positioned so that the gas flows across the surface of the stainless steel screens. These screens are generally closely spaced in the cubes so that the catalyst flows between the plates in relatively intimate contact with the catalyst. As noted previously, other means of supporting the catalyst could be used.

Desirably the catalyst is cleaned by dipping it into an aqueous oxalic acid solution for a period of time sufficient to thoroughly wet the catalyst. Typically this time is from about 30 to about 60 seconds. After dipping the catalyst, it is desirably dried by allowing the cleaned catalyst to drip dry and then rinsing the catalyst and allowing it to drip dry. Thereafter the cleaned catalyst is heated at a temperature from about 120 to about 170° F. for a time from about 2 to about 6 hours, and thereafter heated at a temperature from about 250 to about 1000° F. for a period of time from about 1 to about 3 hours. Desirably the temperatures are raised rapidly to from about 120 to about 170° F. and the temperature is held at this level from about 2 to about 6 hours to avoid steaming the catalyst. It has been found that the increase in the temperature to at least 250° F. is sufficient to calcine the catalyst.

The dried, cleaned catalyst is then immersed in an aqueous vanadium compound-containing solution for a time from about 30 to about 60 seconds. Desirably the vanadium compound is selected from ammonium meta-vanadate and vanadyl oxalate. Vanadyl oxalate is preferred since it is readily available as a liquid solution. This liquid solution may be obtained from SHIELDALLOY METALLURGICAL CORPORATION, 12 West Blvd., Newfield, N.J. 08344. Desirably the rejuvenated catalyst is allowed to drip dry, heated to a temperature from about 120 to about 170° F. for a time from about 2 to about 6 hours, and thereafter heated to a temperature from about 250 to about 1000° F. for a time from about 1 to about 3 hours.

Desirably the catalyst is then tested to determine its efficiency in converting nitrous oxide to nitrogen. If the conversion of nitrous oxide is less than about 50 percent, then the catalyst should be dipped in the catalyst solution and dried again. Desirably the efficiency of the catalyst is at least 50 percent and is more desirably up to about 65 percent based upon the efficiency of the catalyst for converting nitrous oxide to nitrogen. As indicated previously, it is desirable that the catalyst be tested prior to treatment with the vanadium compound-containing solution so that the catalyst is not treated if its activity is above 50 percent initially. Desirably the aqueous vanadium solution contains from about 12.5 to about 50 g/L of the vanadium compound calculated as $V_2O_5$. Similar amounts of the vanadium compound are used whether the ammonium meta-vanadate or the vanadyl oxalate is used.

Figure 2:
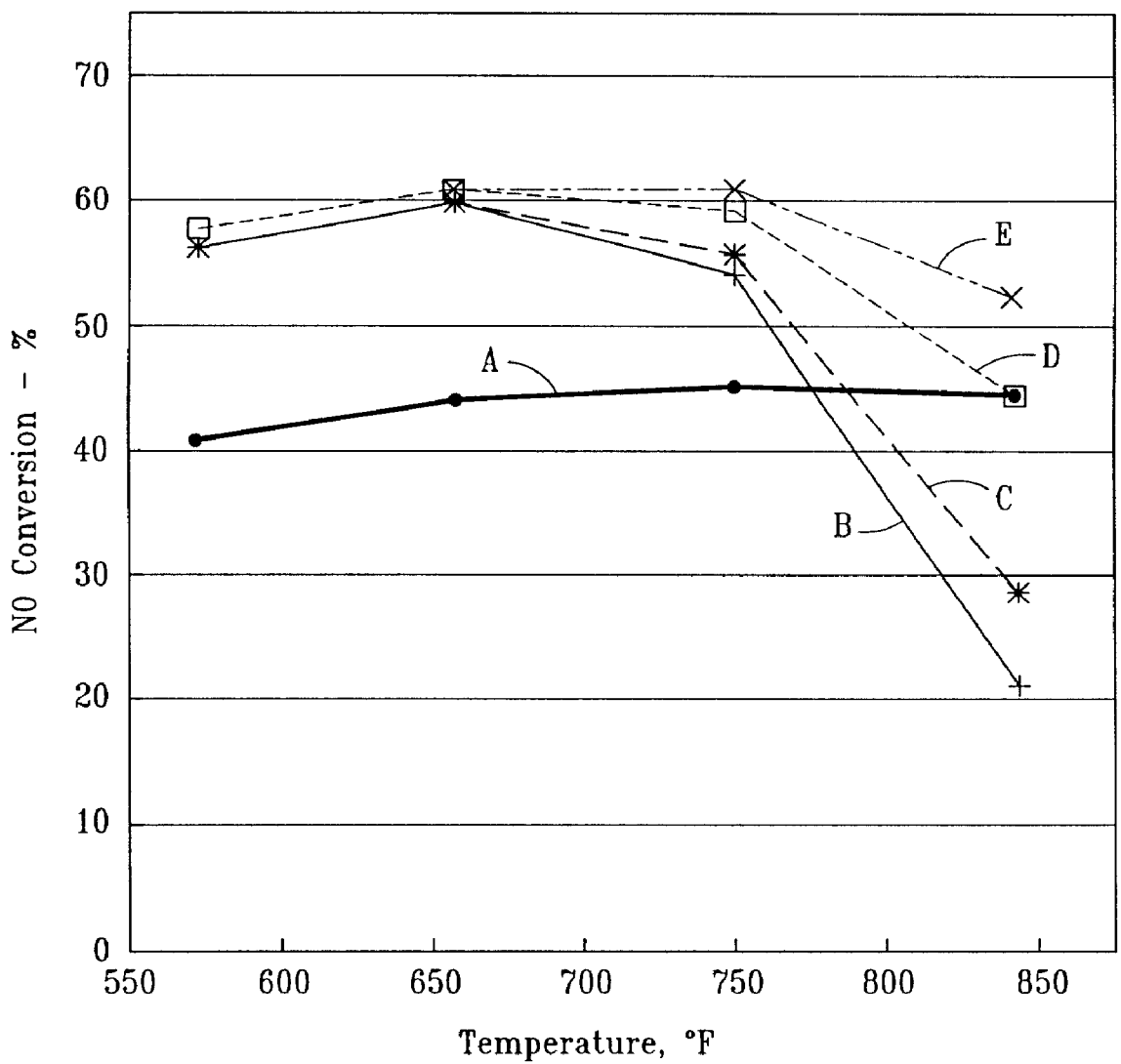
FIG. 2 demonstrates the effectiveness of treatment of the spent de-$NO_x$ catalyst by the process of the present invention.

The rejuvenation of the catalyst in this fashion has been found to be effective to regenerate spent or partially spent catalyst. Catalyst regenerated according to the foregoing method was tested for its activity for nitrous oxide conversion before regeneration and after regeneration at a variety of temperatures. The test results are shown in FIG. 2. The vanadium-containing compound used was vanadyl oxalate. The test results shown by Curve A are the activities for the catalyst prior to treatment. The test results shown by Curve B are after treatment with a solution containing vanadyl oxalate at a concentration of 100 g/L as $V_2O_5$. Curve C shows the results obtained using a solution containing 50 g/L of $V_2O_5$. Curve D shows the results achieved using a solution containing 25 g/L of $V_2O_5$, and Curve E shows the results achieved using a solution containing 12.5 g/L of vanadyl oxalate shown as $V_2O_5$. It will be observed that at all concentrations, the effectiveness of the catalyst is increased up to a temperature of about 800° F. At temperatures above 800° F., the activity of all the catalysts except for Curve E is reduced to 50 percent or less.

It is thus shown that the method of the present invention is effective to rejuvenate spent de-$NO_x$ catalyst. By the method of the present invention, the substantial expense required to replace the catalyst can be avoided by either determining the activity and simply cleaning the catalyst or by rejuvenating the catalyst after cleaning. In either case, a major saving is accomplished by the rejuvenation of the catalyst.

In many applications, it is necessary that the $NO_x$ be reduced to less than about 8.5 parts per million or lower. Catalysts of the type described have been effective to achieve this and greater reductions in $NO_x$.

As indicated previously, this catalyst has been used to treat streams, which are also treated with other catalysts for the conversion of carbon monoxide to carbon dioxide and the like.

Having thus described the present invention by reference to certain of its preferred embodiments, it is noted that the embodiments disclosed are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for cleaning and rejuvenating an at least partially spent de-NOx catalyst comprising a porous ceramic metal oxide material containing a vanadium oxide and coated on a metal support, the method comprising:
    a) contacting the catalyst with an aqueous oxalic acid solution containing from about 1 to about 4 weight percent oxalic acid for a time from about 30 to about 60 seconds to produce a cleaned catalyst;
    b) drying the cleaned catalyst to produce a dried, cleaned catalyst;
    c) contacting the dried, cleaned catalyst with an aqueous vanadium compound solution containing from about 10 to about 100 g/L as $V_2O_5$ of at least one water soluble vanadium salt for a time from about 30 to about 60 seconds to produce a rejuvenated catalyst; and,
    d) drying the rejuvenated catalyst.

2. The method of claim 1 wherein the porous ceramic metal oxide comprises titanium dioxide.

3. The method of claim 2 wherein the metal support comprises a stainless steel screen.

4. The method of claim 1 wherein the catalyst is contacted with the aqueous oxalic acid solution by immersing the catalyst in the aqueous oxalic acid solution.

5. The method of claim 1 wherein the cleaned catalyst is dried by allowing the cleaned catalyst to drip dry, heating the cleaned catalyst to a temperature from about 120 to about 170° F. for a time from about 2 to about 6 hours and thereafter heating the cleaned catalyst to a temperature from about 250 to about 1000° F. for a time from about 1 to about 3 hours.

6. The method of claim 1 wherein the aqueous vanadium compound solution contains from about 12.5 to about 25 g/L as $V_2O_5$ of at least one of ammonium meta vanadate and vanadyl oxalate.

7. The method of claim 6 wherein the aqueous vanadium compound contains vanadyl oxalate.

8. The method of claim 1 wherein the rejuvenated catalyst is allowed to drip dry, heated to a temperature from about 120 to about 170° F. for a time from about 2 to about 6 hours and thereafter heated to a temperature from about 250 to about 1000° F. for a time from about 1 to about 3 hours.

9. The method of claim 1 wherein the rejuvenated catalyst is tested for its efficiency in converting NO to $N_2$.

10. The method of claim 9 wherein the rejuvenated catalyst is contacted with the aqueous vanadium compound solution again if the efficiency of the rejuvenated catalyst is less than about 50 percent.

11. The method of claim 1 wherein the efficiency of the rejuvenated catalyst in converting NO to $N_2$ is greater than 50 percent.

12. The method of claim 1 wherein the efficiency of the catalyst for conversion of NO to $N_2$ is tested prior to contacting the catalyst with the aqueous vanadium salt solution.

13. The method of claim 12 wherein the catalyst has a conversion efficiency less than about 50 percent.

14. The method of claim 1 wherein the aqueous vanadium compound solution contains from about 12.5 to about 50 g/L as $V_2O_5$ of vanadyl oxalate.

15. The method of claim 1 wherein the vanadium compound is selected from the group consisting of ammonium meta vanadate and vanadyl oxalate.

16. The method of claim 1 wherein the vanadium compound is ammonium meta vanadate.

17. The method of claim 1 wherein the vanadium compound is vanadyl oxalate.

* * * * *